United States Patent
Jafoui et al.

(10) Patent No.: US 7,952,255 B2
(45) Date of Patent: May 31, 2011

(54) ROTOR FOR AN ELECTRICAL MACHINE AND ELECTRICAL MACHINE FOR A DRIVETRAIN IN A MOTOR VEHICLE

(75) Inventors: Khalid Jafoui, Hallstadt (DE); Alexander Schäflein, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 49 days.

(21) Appl. No.: 12/400,835

(22) Filed: Mar. 10, 2009

(65) Prior Publication Data
US 2009/0230800 A1    Sep. 17, 2009

(30) Foreign Application Priority Data
Mar. 14, 2008    (EP) ..................................... 08004833

(51) Int. Cl.
*H02K 1/28* (2006.01)

(52) U.S. Cl. .................................. 310/261.1; 310/67 R

(58) Field of Classification Search .................. 310/67 R, 310/156.08, 156.12, 156.26, 156.28, 156.29, 310/156.45, 216.018, 216.045, 216.046, 310/216.065; 180/65.25; 192/113.3
See application file for complete search history.

(56) References Cited

U.S. PATENT DOCUMENTS

| | | | |
|---|---|---|---|
| 6,049,930 A * | 4/2000 | Hisano et al. | 8/159 |
| 6,093,984 A * | 7/2000 | Shiga et al. | 310/26 |
| 7,105,970 B2 * | 9/2006 | Yajima et al. | 310/156.45 |
| 7,109,627 B2 * | 9/2006 | Welke et al. | 310/216.018 |
| 2005/0099080 A1 | 5/2005 | Matsumoto | |
| 2006/0097595 A1 * | 5/2006 | Randriamanantena | 310/156.08 |
| 2006/0289209 A1 * | 12/2006 | Grosspietsch et al. | 180/65.2 |

FOREIGN PATENT DOCUMENTS

| | | |
|---|---|---|
| DE | 8711573 | 8/1988 |
| DE | 10226572 | 1/2004 |
| EP | 1511154 | 3/2005 |
| JP | 2005151731 | 6/2005 |

* cited by examiner

*Primary Examiner* — Tran N Nguyen
(74) *Attorney, Agent, or Firm* — Cohen Pontani Lieberman & Pavane LLP

(57) ABSTRACT

A rotor and an electrical machine for a motor vehicle drivetrain. The rotor includes a rotor carrier with a radial supporting area, an axial supporting area, which extends axially with respect to the axis of rotation of the rotor and which is connected to the radial supporting area and has an inner or an outer first circumferential surface, and a rotor component which conducts magnetic flux and is arranged at the circumferential surface of the axial supporting area. To achieve a rotationally locking connection between the rotor carrier and the rotor component conducting magnetic flux, it is proposed to form the axial supporting area with a positive engagement profile which extends in axial direction of the rotor for receiving, in a positive engagement, the rotor component conducting magnetic flux.

18 Claims, 4 Drawing Sheets

ROTOR FOR AN ELECTRICAL MACHINE AND ELECTRICAL MACHINE FOR A DRIVETRAIN IN A MOTOR VEHICLE

BACKGROUND OF THE INVENTION

1. Field of the Invention

The invention is directed to a rotor for an electrical machine and an electrical machine for a vehicle drivetrain.

2. Description of the Related Art

Electrical machines and their use in a motor vehicle as the sole driving source or as additional driving source are generally known for electric vehicles or hybrid vehicles. A rotor of an electrical machine usually comprises a rotor carrier with a cylindrical supporting region for receiving a rotor component which conducts magnetic flux. A rotor of this kind generates a torque—a driving torque or braking torque depending on application—through the magnetic interaction with the stator of the electrical machine in order to transmit this torque to other elements which are connected to the rotor so as to be fixed with respect to rotation relative to it or to generate electrical energy for supplying a vehicle electrical system. This torque must be absorbed by the area where the rotor carrier joins the rotor component conducting magnetic flux, which requires a design based particularly on the torque occurring during operation of the electrical machine and its quantitative change over time.

SUMMARY OF THE INVENTION

It is the object of the invention to provide a rotor for an electrical machine of a motor vehicle drivetrain in which the rotor carrier is connected to a rotor component conducting magnetic flux such that it is fixed with respect to rotation relative it in a particularly secure manner and to provide an electrical machine for use in a motor vehicle drivetrain.

The invention meets this object by providing rotor for an electrical machine of a motor vehicle drivetrain, comprising a rotor carrier having a radial supporting area, an axial supporting area which extends axially with respect to an axis of rotation of the rotor and which is connected to the radial supporting area and has one of an inner and an outer first circumferential surface; a rotor component which conducts magnetic flux arranged at the circumferential surface of the axial supporting area, and wherein the axial supporting area has a positive engagement profile which extends in an axial direction of the rotor for receiving in a positive engagement the rotor component conducting magnetic flux.

The present invention is also directed to an electrical machine for use in a motor vehicle drivetrain, comprising a stator with a winding and a rotor. In the proposed rotor for an electrical machine with a rotor carrier, the rotor carrier comprises a radial supporting area, an axial supporting area which extends axially with respect to the axis of rotation of the rotor and which is connected to the radial supporting area and has an inner or an outer first circumferential surface, and a rotor component which conducts magnetic flux and is arranged at the circumferential surface of the axial supporting area. The axial supporting area has a positive engagement profile which extends in axial direction of the rotor for receiving in a positive engagement the rotor component conducting magnetic flux.

A positive engagement profile of the kind mentioned above provides an effective rotationally driving connection between the rotor carrier and the rotor component conducting magnetic flux in the circumferential direction of the rotor, that is, in its rotating direction. If necessary, the rotor component can be secured in axial direction at the axial supporting area, for which purpose a fixed stop, insertable fastening elements, deformed portions, or the like can be provided at the supporting area. Particularly cumbersome connecting methods such as gluing, welding, shrink fitting, riveting, and screwing can largely be dispensed with. The proposed positive engagement connection can be applied when using either an external rotor or an internal rotor.

According to a first advantageous embodiment, the component conducting magnetic flux is constructed as a lamination stack with a positive engagement profile corresponding to the axial supporting area of the rotor. When the electrical machine is to be operated within a broad temperature range or heats up intensively during operation, the structural component part having the positive engagement profile can be fabricated from a material whose coefficient of expansion corresponds at least approximately to that of the lamination stack in order to achieve a secure fit. An iron material, e.g., a steel, is particularly suitable for this purpose.

In a permanently excited synchronous machine, it is also possible to arrange the permanent magnets on the rotor carrier directly, i.e., without a lamination stack. In this case, the component conducting magnetic flux is formed by at least one permanent magnet which can be constructed, e.g., as a one-piece ring magnet. However, there can also be a plurality of permanent magnets distributed at the circumference of the rotor carrier. In both cases, the permanent magnet or permanent magnets can have an outer contour corresponding to the positive engagement profile of the axial supporting area. This also applies to a plurality of permanent magnets which are inserted individually into the positive engagement profile, e.g., into receiving spaces of enlarged depth at the cylindrical supporting area. In the latter case, additional fastening elements may be provided, or required, to secure the individual magnet poles.

When the rotor has a hollow space in its inner area as, for example, in a cup-shaped rotor, the second circumferential surface remote of the first circumferential surface can advantageously also have a positive engagement profile which can serve to receive an element in a rotationally driving connection with the rotor.

In the variants described above, the cylindrical rotor carrier can be formed of multiple parts with an element which has the positive engagement profile and which is arranged on the radial inner side and/or on the radial outer side. According to another constructional variant, in a particularly advantageous manner at least the axial supporting area is fashioned from a plate body and the positive engagement profile or positive engagement profiles is/are formed at the plate body. In particular, a cold-workable or hot-workable plate material is used for this purpose so that the rotor carrier with its radial and cylindrical supporting areas can be formed in one piece from a flat or tubular blank, and at least one positive engagement profile can be integrally formed at the same time.

The positive engagement profiles provided at the two circumferential surfaces can be produced simultaneously particularly in connection with the shaping process. Each positive engagement profile can have a function that is independent from that of the other.

Even more advantageously, the positive engagement profile formed at one circumferential surface can form the positive engagement profile of the other respective circumferential surface at the same time. For this purpose, recesses in the positive engagement profile of one circumferential surface can serve at the same time as projections in the positive engagement profile of the other respective circumferential surface remote therefrom. The positive engagement profile can be constructed as a radial toothing with a wide variety of tooth geometries.

The element which is in a rotationally driving connection with the rotor can be constructed in many different ways. For example, the element can be part of a clutch, torsional vibration damper, driveshaft, etc. In a preferred construction, the positive engagement profile is formed as a disk carrier for receiving disks of a releasable clutch. The rotor carrier with its positive engagement profile can also form the input part or output part of a plug-in toothing to connect to another drivetrain component. For this purpose, a simple assembly interface can be formed for fitting the drivetrain.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the following, the invention will be described by way of example with reference to the accompanying drawings.

DETAILED DESCRIPTION OF THE PRESENTLY PREFERRED EMBODIMENTS

Figure 1:
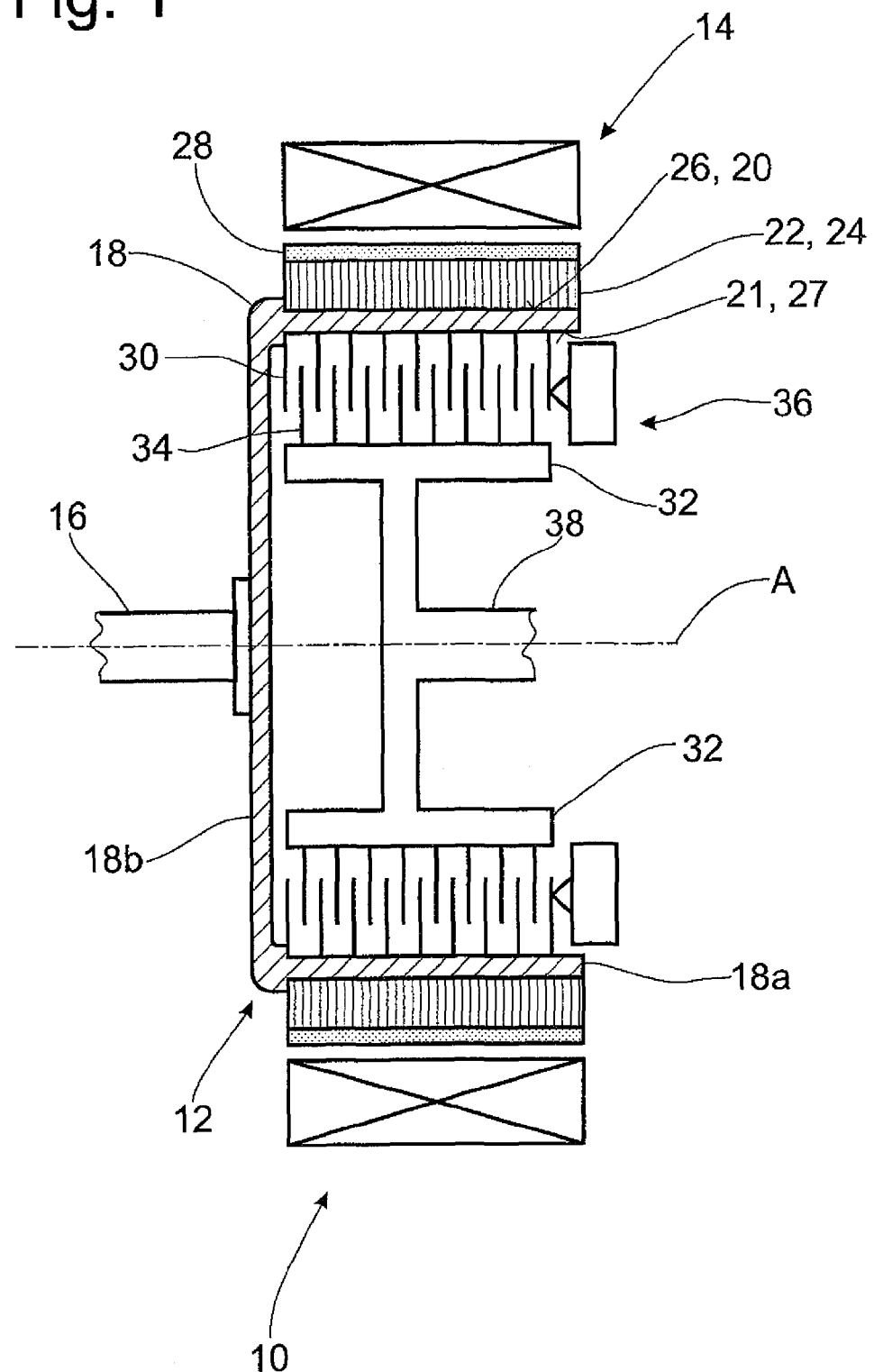
FIG. 1 shows a schematic view in axial section through an electrical machine constructed as an internal rotor with a cup-shaped rotor, a multi-disk clutch being constructed in its interior.

FIG. 1 shows a schematic axial sectional view through a permanent magnet synchronous machine 10 for installation in a vehicle drivetrain in an internal rotor type construction with a cup-shaped rotor 12 which is surrounded by a winding-supporting stator 14 and which can rotate by means of a rotor shaft 16 around an axis of rotation A. The rotor 12 has a rotor carrier 18 which is fashioned as a shaped part from sheet steel by pressing rollers or deep drawing and which has an axial supporting area 18a extending axially with respect to the axis of rotation and, adjoining the latter, a radial supporting area 18b which is provided for connecting to the rotor shaft 16. As will be described in more detail referring to the other drawings, the axial supporting area 18a has a positive engagement profile 20 extending in axial direction of the rotor 12 for receiving in a positive engagement a rotor component conducting magnetic flux. In this example, the rotor component conducting magnetic flux is formed as a lamination stack 24 by stamping from a plurality of plates 22 in a known manner and is arranged at the outer circumferential surface 26 of the supporting area 18a. A plurality of permanent magnets 28 which can enter into electromagnetic interaction with a coil winding of the stator 14 during operation of the electrical machine 10 and can generate a motor torque or a generator torque are arranged at the outer circumferential surface of the lamination stack 24.

Figure 2A:
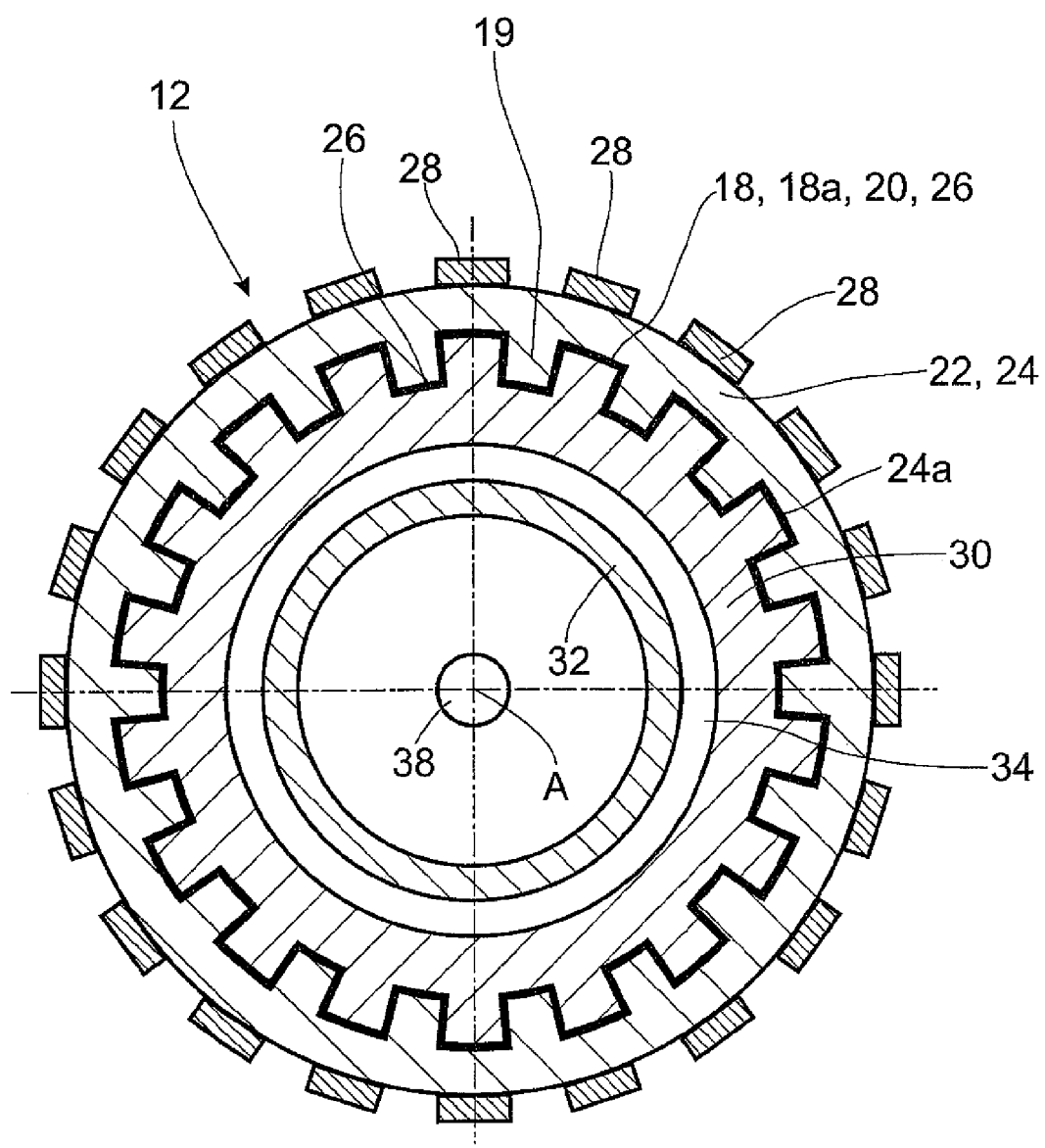
FIG. 2a is a radial view of a rotor carrier with a positive engagement profile formed at the inner circumferential surface and outer circumferential surface for receiving a lamination stack and a clutch disk stack.

FIG. 2a shows a schematic, partially radial view of the rotor 12 with the rotor carrier 18 and with the lamination stack 24 arranged at the latter. The positive engagement profile 20 of the axial supporting area 18a is formed directly at the plate body as a radial toothing extending continuously in axial direction at the rotor 12 and having a slightly trapezoidal tooth structure with grooves 19 which widen radially outward. Alternatively, the positive engagement profile can also be constructed with rectangular elements or as a dovetail profile with grooves narrowing radially outward, which is suitable particularly for the arrangement of individual permanent magnets. However, it is also possible for the positive engagement profile 20 to have discontinuities in axial directions. It is crucial that the rotor component 22, 24 conducting magnetic flux can be fitted axially or, as the case may be, radially to the rotor carrier 18a. Accordingly, in the present case a positive engagement profile 24a corresponding to the axial supporting area 18a is formed at the lamination stack 24, more precisely, at its radial inner circumferential surface.

It can be seen from the radial view in FIG. 2a that the positive engagement profile 20 formed at the outer circumferential surface 26 of the supporting area 18a simultaneously forms the positive engagement profile 21 of the inner circumferential surface 27 for receiving an element 30 in rotary driving connection with the rotor 12 in the drivetrain of a vehicle, which element 30 is formed in this instance as an outer disk or outer lamination stack 30 of a clutch 32 (FIG. 1), particularly a dry or wet shiftable clutch. Therefore, the lamination stack 30 forms an input area or an output area of the clutch 32 depending on the flow of torque.

Of course, the positive engagement profile 20 can also be constructed independent from the area where the rotor carrier 18a joins the rotor component 24 conducting magnetic flux. The constructions described above also apply in principle to the positive engagement profile 21 for arranging the element 30 in a rotationally driving connection with the rotor 12.

The outer disks 30 are axially displaceable on the supporting area 18a and interact with internal disks 34 disposed between them which are likewise axially displaceable on an internal disk carrier 32. The internal disk carrier 32 is fixedly connected to a clutch shaft 38 by which a torque can be transmitted e.g., to a gear-changing transmission. The disks 30, 34 can be acted upon by an actuating force through the action of a clutch release member 36 (FIG. 1) so that the drivetrain components connected in the drivetrain to the external disk carrier 18a, i.e., the rotor 12, and the internal disk carrier 32 can be brought into a rotationally driving connection.

In order to arrange the lamination stack 24 and the clutch disks 30 at the rotor 12, they are simply fitted to the axial supporting area 18a of the rotor carrier 18 on the radial outer side or on the radial inner side in axial direction. If desired, a press fit can also be generated to form the lamination stack 24 and can be secured axially by means of fastening elements, not shown in the drawings.

Figure 2B:
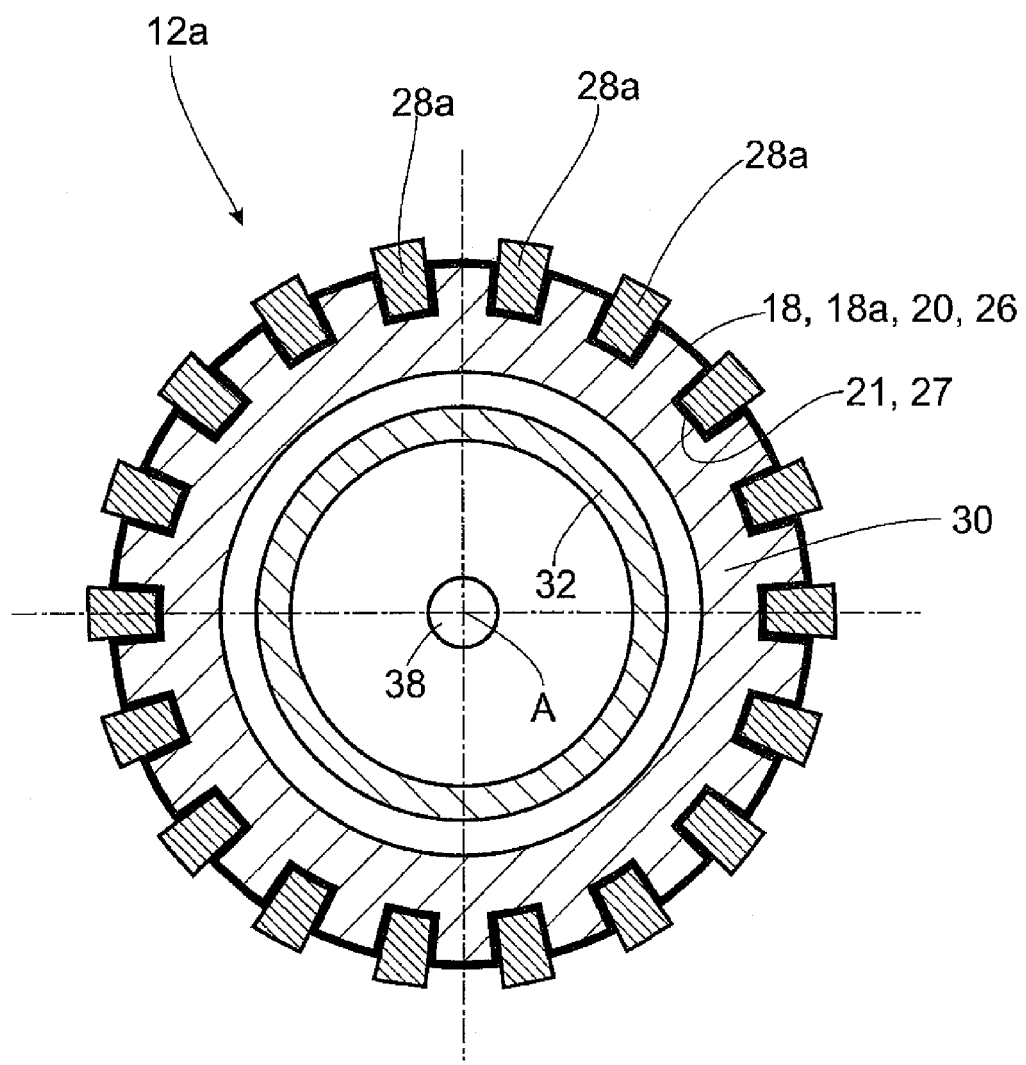
FIG. 2b is a radial view of a rotor carrier with a positive engagement profile formed at the outer circumferential surface for receiving individual permanent magnets.

FIG. 2b shows a rotor 12a with the rotor carrier 18 of FIG. 2a with the trapezoidal positive engagement profile 20, a permanent magnet 28a being inserted into the recesses of the positive engagement profile 20 which are formed as axial grooves 19 or inserted from the radial outer side and secured to the outer circumferential surface 26 of the rotor 12a in this way. To secure the permanent magnets 28a, the rotor 12a can also be bound in a known manner.

Figure 2C:
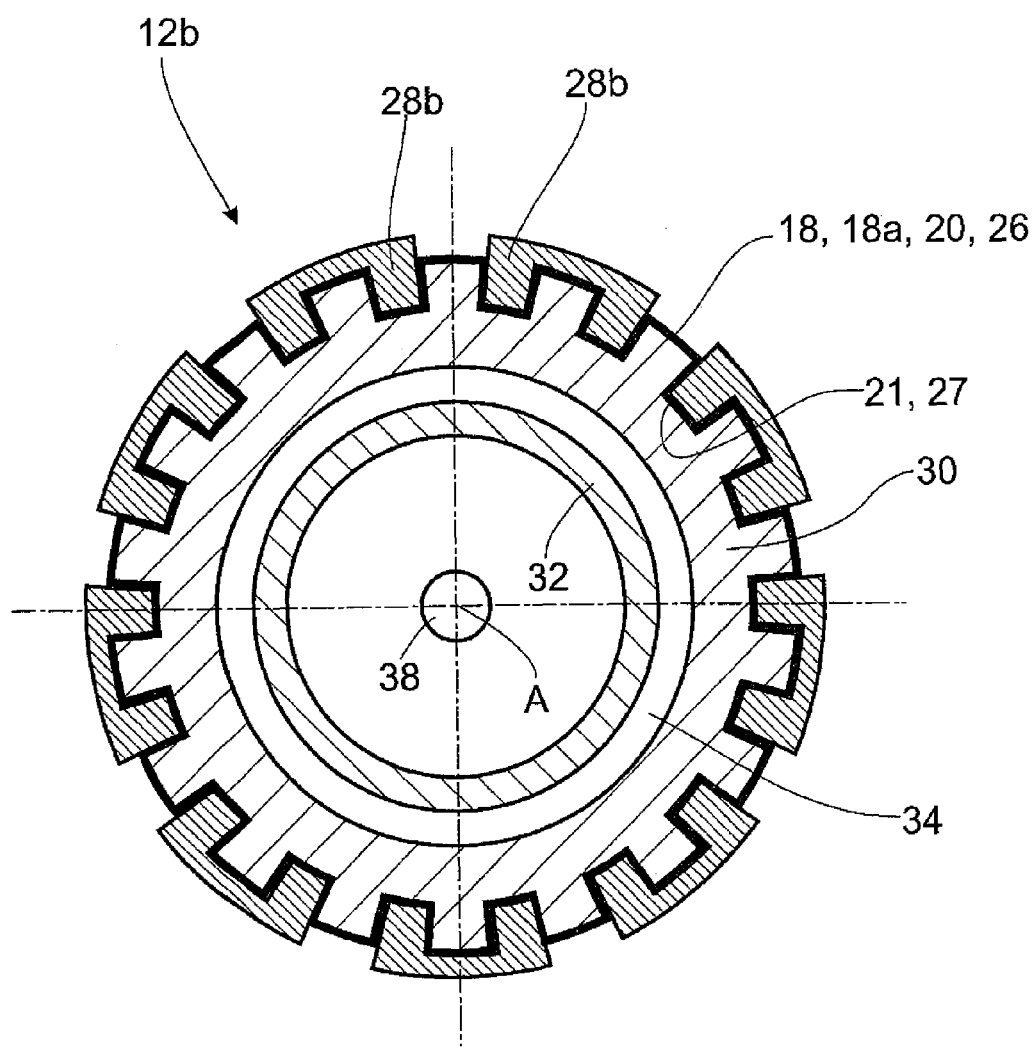
FIG. 2c shows a radial view of the rotor carrier according to FIG. 2a or b, in which a permanent magnet extends over several periods of the positive engagement profile.

According to the rotor 12b shown in FIG. 2c, a magnet can also extend over a plurality of periods of the positive engagement profile 20 in circumferential direction at the rotor carrier 18, wherein the outer contour of a permanent magnet 28b directed to the supporting area 18a corresponds to the positive engagement profile 20. In this way, a plurality of grooves, two grooves in the present example, are associated with a permanent magnet 28b. Reference is had to FIG. 1 and FIG. 2a for further details of the construction of the rotors 12a,b shown in FIGS. 2a,b.

The invention is not limited by the embodiments described above which are presented as examples only but can be modified in various ways within the scope of protection defined by the appended patent claims.

We claim:

1. A rotor for an electrical machine of a motor vehicle drivetrain, comprising: a rotor carrier (18) having a radial supporting area (18b), an axial supporting area (18a) extending axially with respect to an axis of rotation (A) of the rotor (12) and being connected to the radial supporting area (18b) and having an inner and an outer circumferential surfaces; a rotor component (24) for conducting magnetic flux arranged at one of the inner and outer circumferential surface of the axial supporting area (18a); said axial supporting area (18a) having a positive engagement profile extending in an axial direction of the rotor (12) for receiving in a positive engagement the rotor component (24) conducting magnetic flux; and wherein the positive engagement profile formed at said one of said inner and outer circumferential surface (26) simultaneously forms the positive engagement profile of other one of said iner and outer circumferential surface (27).

2. The rotor according to claim 1, wherein the component for conducting magnetic flux is constructed as a lamination stack (24) with a positive engagement profile (24a) corresponding to the positive engagement profile of the axial supporting area.

3. The rotor according to claim 1, wherein the component for conducting magnetic flux is formed by at least one permanent magnet (28a) having an outer contour corresponding to the positive engagement profile (20) of the axial supporting area (18a).

4. The rotor according to claim 1, additionally comprising one of an inner (27) and an outer (26) second circumferential surface remote of the first circumferential surface, and wherein the axial supporting area (18a) at the second circumferential surface (27) has a positive engagement profile (21) for receiving an element (30) in a rotationally driving connection with the rotor (12).

5. The rotor according to claim 1, wherein at least the axial supporting area (18a) is fashioned from a plate body, and the positive engagement profile (20) is formed at the plate body.

6. The rotor according to claim 1, wherein at least one positive engagement profile (20, 21) is formed as a radial toothing.

7. The rotor according to claim 4, wherein the element in a rotary driving connection with the rotor (12) is constructed as one or more disk (30) of a releasable clutch (32).

8. The rotor according to claim 4, wherein the positive engagement profile (20, 21) of the axial supporting area (18a) forms one of the input part and output part of a plug-in toothing connect into a drivetrain component.

9. An electrical machine for use in a motor vehicle drivetrain, comprising a stator (14) with a winding and a rotor constructed according to claim 1.

10. An electrical machine for use in a motor vehicle drivetrain, comprising a stator (14) with a winding and a rotor constructed according to claim 2.

11. An electrical machine for use in a motor vehicle drivetrain, comprising a stator (14) with a winding and a rotor constructed according to claim 3.

12. An electrical machine for use in a motor vehicle drivetrain, comprising a stator (14) with a winding and a rotor constructed according to claim 4.

13. An electrical machine for use in a motor vehicle drivetrain, comprising a stator (14) with a winding and a rotor constructed according to claim 5.

14. An electrical machine for use in a motor vehicle drivetrain, comprising a stator (14) with a winding and a rotor constructed according to claim 1.

15. An electrical machine for use in a motor vehicle drivetrain, comprising a stator (14) with a winding and a rotor constructed according to claim 6.

16. An electrical machine for use in a motor vehicle drivetrain, comprising a stator (14) with a winding and a rotor constructed according to claim 7.

17. An electrical machine for use in a motor vehicle drivetrain, comprising a stator (14) with a winding and a rotor constructed according to claim 8.

18. A rotor for an electrical machine of a motor vehicle drivetrain, comprising:
a rotor carrier (18) having a radial supporting area (18b), an axial supporting area (18a) extending axially relative to an axis of rotation (A) of said rotor (12) and being connected to said radial supporting area (18b), said axial support area (18a) having an outer circumferential surface (26) and an inner circumferential surface (27);
a rotor component (24) for conducting magnetic flux arranged at said outer circumferential surface 26; and wherein said axial supporting area (18a) has a positive engagement profile (20) extending in an axial direction of said rotor (12) for receiving, in a positive engagement, said rotor component (24) for conducting magnetic flux; said positive engagement profile (20) simultaneously forming a positive engagement profile of said outer circumferential surface (26) and a positive engagement profile of said inner circumferential surface (27).

* * * * *